United States Patent
Shintani

(10) Patent No.: US 6,837,628 B2
(45) Date of Patent: Jan. 4, 2005

(54) BARRIER OPENING AND CLOSING MECHANISM

(75) Inventor: Dai Shintani, Kishiwada (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 10/127,178

(22) Filed: Apr. 22, 2002

(65) Prior Publication Data

US 2002/0168190 A1 Nov. 14, 2002

(30) Foreign Application Priority Data

May 14, 2001 (JP) ........................................ 2001-143080

(51) Int. Cl.⁷ .......................... G03B 15/00; G03B 17/00
(52) U.S. Cl. ...................................... 396/351; 396/448
(58) Field of Search ................................ 396/351, 352, 396/448

(56) References Cited

U.S. PATENT DOCUMENTS

| | | | | |
|---|---|---|---|---|
| 4,609,270 A | * | 9/1986 | Kohno et al. ................. | 396/74 |
| 5,761,556 A | * | 6/1998 | Ichino ........................ | 396/349 |
| 6,033,130 A | | 3/2000 | Muroi et al. ................ | 396/448 |
| 6,264,380 B1 | * | 7/2001 | Omiya ....................... | 396/448 |
| 6,278,844 B1 | * | 8/2001 | Takeshita ................... | 396/85 |
| 6,312,168 B1 | * | 11/2001 | Naruse et al. .............. | 396/349 |
| 6,334,718 B1 | * | 1/2002 | Akiba et al. ................ | 396/448 |

\* cited by examiner

Primary Examiner—Christopher E Mahoney
(74) Attorney, Agent, or Firm—Sidley Austin Brown & Wood LLP

(57) ABSTRACT

A barrier opening and closing mechanism includes a refractive optical system having a plurality of lens elements and disposed so as to refract light substantially at right angles; a lens barrel holding the refractive optical system; a rotary cam ring disposed concentrically with the lens barrel, having a first cam groove, and rotating on an optical axis of subject light having been refracted; a lens driving mechanism driving, in a direction of the optical axis, at least one lens element included in the refractive optical system engaged with the first cam groove; and a barrier member protecting a most subject side lens element of the refractive optical system. In the barrier opening and closing mechanism, the rotary cam ring has, in a predetermined angle range on an outer surface thereof, a second cam groove including a region extending obliquely to the optical axis, a driving member is provided that has a cam follower engaged with the second cam groove and is driven in a direction substantially parallel to the optical axis, and the barrier is opened and closed by moving in response to a movement of the driving member in the predetermined angle range.

20 Claims, 5 Drawing Sheets

BARRIER OPENING AND CLOSING MECHANISM

This application is based on Japanese Paten Application No. Hei 2001-143080 filed in Japan on May 14 2001, the entire content of which is hereby incorporated by reference.

FIELD OF THE INVENTION

The present invention relates to a mechanism for opening and closing a barrier for protecting the taking lens of a camera disposed at an opening through which subject light is incident.

DESCRIPTION OF RELATED ART

Many recent cameras incorporate an openable barrier instead of a detachable lens cap. The barrier, which is provided for protecting the taking lens, is fully closed when the camera is not used, and is fully opened when the camera is used. The lens barrier has various types such as a one-bladed type and a two-bladed type.

For example, digital cameras using a lens barrel comprising at least two barrels coupled so as to be collapsible (hereinafter, referred to as a collapsible lens barrel) are known, and as the barrier opening and closing mechanism used in the lens barrel of the digital camera, the following three types are widely known: an in-barrel barrier that covers only the effective diameter of the taking lens at the end of the lens barrel; an inner slide barrier that covers the largest-diameter barrel of the collapsible lens barrel inside the exterior cover, and an outer slide barrier that covers the largest-diameter barrel outside the exterior cover.

However, when the collapsible lens barrel is adopted, in the case of the in-barrel barrier, a mechanism for transmitting the driving force from the driving source to the barrier mechanism at the end of the lens barrel is essential, so that it is feared that the lens barrel driving load increases and the structure of the lens barrel is complicated. In the case of the inner slide barrier, since it is necessary to cover the largest-diameter barrel, the size of the barrier itself increases, so that a space for moving the barrier is required in the camera and large power is necessary for driving the barrier. Consequently, a driving source other than the lens barrel driving source, or a mechanism for increasing the barrier driving amount is required. In the case of the outer slide barrier, since it is difficult to electrically drive it and it is therefore necessary for the user to exert an external force to drive it, it is necessary to provide a robust guide member or the like on the body.

SUMMARY OF THE INVENTION

The present invention is made to solve the above-mentioned problem, and an object thereof is to provide a barrier opening and closing mechanism for the inner slide barrier capable of opening and closing the barrier with a simple driving mechanism, reduce the manufacturing cost of the camera body, and attain camera size reduction.

The above-mentioned object is attained by providing a barrier opening and closing mechanism having the following structure:

The barrier opening and closing mechanism of the present invention is provided with: a refractive optical system having a plurality of lens elements and disposed so as to refract light substantially at right angles; a lens barrel holding the refractive optical system; a rotary cam ring disposed concentrically with the lens barrel, having a first cam groove, and rotating on an optical axis of subject light having been refracted; a lens driving mechanism driving, in a direction of the optical axis, at least one lens element included in the refractive optical system engaged with the first cam groove; and a barrier member protecting a most subject side lens element of the refractive optical system. In the barrier opening and closing mechanism, the rotary cam ring has, in a predetermined angle range on an outer surface thereof, a second cam groove including a region extending obliquely to the optical axis, a driving member is provided that has a cam follower engaged with the second cam groove and is driven in a direction substantially parallel to the optical axis, and the barrier is opened and closed by moving in response to a movement of the driving member in the predetermined angle range.

In the above-described structure, the barrier opening and closing mechanism drives the barrier with the cam mechanism using the cam grooves provided on the outer surface of the rotary cam ring for driving the lens system. That is, the cam ring is provided with the two kinds of cam grooves: the first cam groove for driving the lens (for focusing or zooming) and the second cam groove for driving the barrier. It is preferable that the first cam groove for driving the lens be provided on the inner surface of the rotary cam ring. The second cam groove for driving the barrier includes the region extending obliquely to the optical axis on the outer surface in the predetermined angle range so that the driving member having the cam follower engaged with the second cam groove is driven only in the predetermined angle range of the rotary cam ring. The first and the second cam grooves are disposed so that the barrier can be opened and closed while the rotary cam ring rotates in the predetermined angle range.

In the above-described structure, the first and the second cam grooves are formed so that with respect to the angle at which the rotary cam ring rotates, an angle range in which the first cam groove functions can be distinguished from the predetermined angle range in which the second cam groove functions. These angle ranges are not necessarily clearly separated, but may overlap each other; it is necessary only that the angle range is roughly divided into a range in which mainly the barrier is driven and a range in which mainly the lens is driven. With this structure, the lens driving and the barrier driving can be separately controlled. That is, the regions in which the positions of the cam followers engaged with the first cam groove and the second cam groove change can be shifted from each other in accordance with the angle at which the rotary cam ring rotates. Consequently, the timings at which the lens driving and the barrier driving substantially deliver their functions can be shifted from each other. That is, while the rotary cam ring is rotating within the predetermined angle range, the barrier is driven in a change width sufficient for opening and closing the taking lens surface, and the lens for performing focusing or zooming is not driven (lens driving not for focusing or zooming may be performed). When the rotary cam ring rotates beyond the predetermined angle range, the barrier driving for protecting the taking lens is not performed (barrier driving not for protecting the taking lens may be performed), and the lens driving for performing focusing or zooming is performed.

According to the above-described structure, since the barrier can be driven with a simple structure by the movement of the rotary cam ring for driving the lens, an inner slide barrier can be structured in a size substantially the same as the size of the in-barrel barrier compared to the circular collapsible lens barrel, and it is unnecessary to provide another driving member or a driving direction converting mechanism for the driving.

Further, in the barrier opening and closing mechanism of the present invention, the barrier is driven in a direction substantially parallel to the optical axis.

In the above-described structure, since the rotary cam ring rotates on the optical axis, by making the direction of the driving of the driving member by the cam groove parallel to the optical axis, the structure of the barrier opening and closing mechanism can be simplified. Consequently, according to the above-described structure, a driving direction converting mechanism for driving the barrier is not required, so that the structure of the barrier opening and closing mechanism can be simplified.

Further, in the barrier opening and closing mechanism of the present invention, the second cam groove extends in a direction substantially vertical to the optical axis outside the predetermined angle range.

In the above-described structure, the second cam groove (the cam groove for driving the barrier) is structured so as to drive the barrier only when the rotary cam ring rotates in the predetermined angle range as described above, whereas the driving member can be made not to be driven when the rotary cam ring rotates beyond the predetermined range.

According to the above-described structure, since the barrier is driven only in a width necessary for opening and closing the taking lens, the stroke of the barrier can be reduced, so that the space for housing the barrier can be reduced.

Further, in the barrier opening and closing mechanism of the present invention, the first cam groove extends in a direction substantially vertical to the optical axis in the predetermined angle range.

In the above-described structure, the first cam groove (the cam groove for driving the lens) is structured so as to drive the lens only when the rotary cam ring rotates beyond the predetermined angle range as described above, and the lens can be made not to be driven when the rotary cam ring rotates in the predetermined range.

According to the above-described structure, since the lens is driven only in a width necessary for focusing or zooming and the lens can be made not to be driven while the barrier is being driven, the driving torque can be reduced.

A barrier opening and closing mechanism of the present invention is provided with: a taking lens comprising an incident portion on which light is made incident, a refracting portion refracting incident light substantially at right angles, and a light directing portion directing refracted light to an image sensing device; and a barrier member held so as to be rectilinearly movable in a direction parallel to the light directing portion, and protecting the taking lens by coming out and retracting to and from a front surface of the taking lens in the incident portion.

According to the above-described structure, since the barrier is disposed so as to move rectilinearly along the optical axis of the refracting optical system, the barrier opening and closing mechanism can be constructed only of the structure rectilinearly moving the barrier, so that size reduction can be attained. In the conventional structure, since the movement direction of the barrier is different from the optical axis and an independent driving mechanism is necessary for each of the barrier and the lens, reduction in the size of the opening and closing mechanism is difficult, so that reduction of the overall size of the camera cannot be realized.

Further, the barrier opening and closing mechanism of the present invention is provided with a driving member controlling the coming out and retraction of the barrier member in response to a movement of the taking lens. With this, the barrier opening and closing mechanism can be performed in response to the photographing operation.

A barrier opening and closing mechanism of the present invention is provided with: a taking optical system on which subject light is made incident; a barrier member movable between a position that covers a front surface of the taking optical system and a position retracted from the front surface of the taking optical system; and barrier driving means rectilinearly driving the barrier member in a direction parallel to an optical axis.

According to the above-described structure, since the barrier is disposed so as to rectilinearly move in the direction parallel to the optical axis, the barrier opening and closing mechanism can be constructed only of the structure rectilinearly moving the barrier, so that size reduction can be attained. In the conventional structure, since the movement direction of the barrier is different from the optical axis and an independent driving mechanism is necessary for each of the barrier and the lens, reduction in the size of the opening and closing mechanism is difficult, so that reduction of the overall size of the camera cannot be realized.

Further, in the barrier opening and closing mechanism of the present invention, the taking optical system has a refracting portion refracting incident light substantially at right angles.

Further, in the barrier opening and closing mechanism of the present invention, the barrier driving means drives the barrier member in a direction parallel to the incident light having been retracted.

Further, in the barrier opening and closing mechanism of the present invention, the taking optical system has a movable optical member, and single controlling means is provided for driving the barrier driving means and the optical member.

Further, in the barrier opening and closing mechanism of the present invention, the controlling means comprises cam grooves of different configurations provided in one cam ring.

Further, in the barrier opening and closing mechanism of the present invention, the cam grooves are formed so that the optical member is not driven when the barrier is driven and that the barrier is not driven when the optical member is driven.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Figure 1:
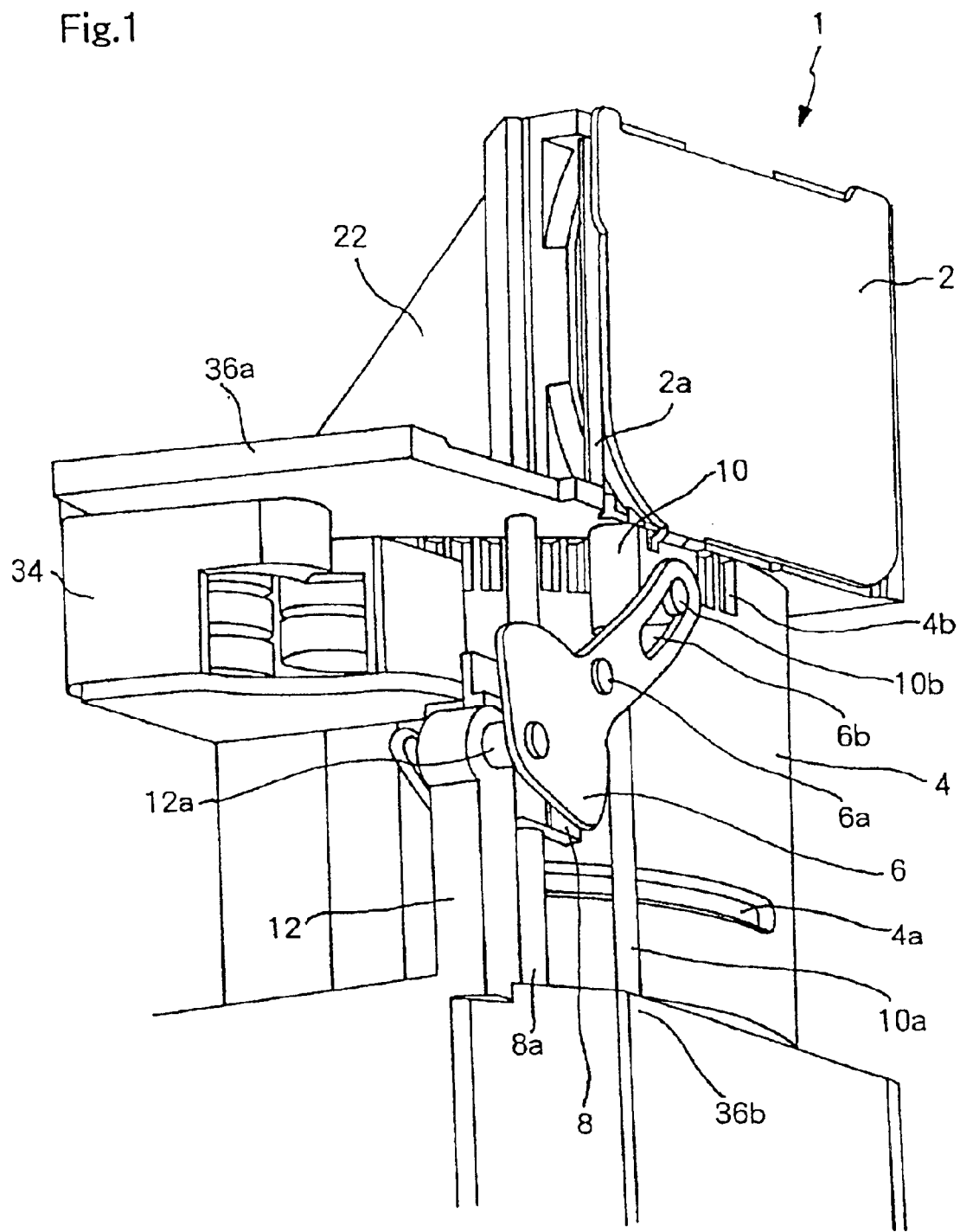
FIG. 1 is an enlarged perspective view of a relevant part of a lens barrel according to an embodiment of the present invention in a condition where the barrier is closed.
Figure 5:
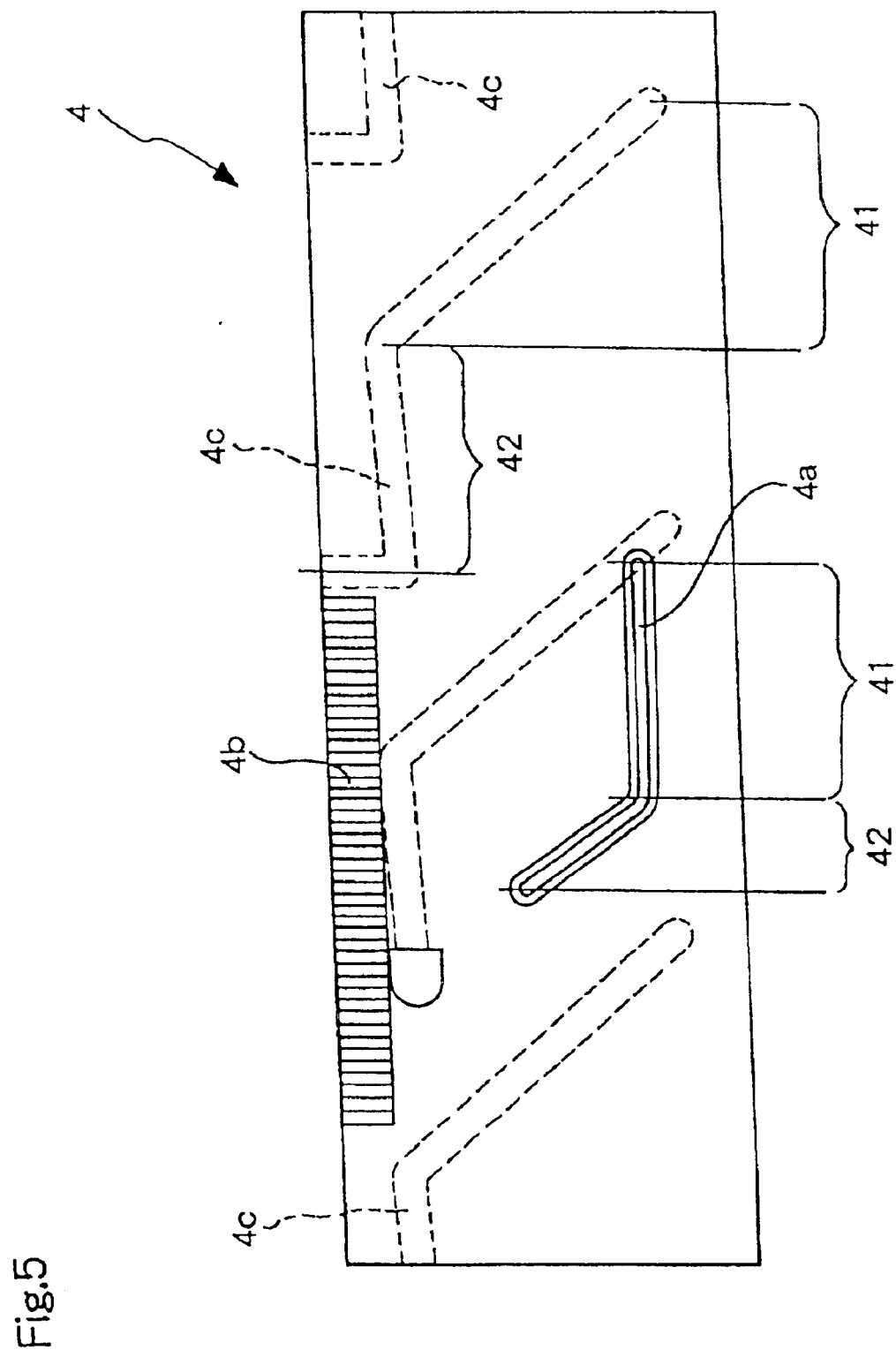
FIG. 5 is a developed view of a rotary cam ring.

FIG. 1 is an enlarged perspective view of a relevant part of a lens barrel according to an embodiment of the present invention in a condition where the barrier is closed. The lens barrel 1 is disposed in an upright position in a body 32 of a digital camera as shown in the relevant part enlarged side view of FIG. 3. The subject light incident from the taking lens 20 through an opening 32a provided in the body 32 is turned approximately 90 degrees in a vertical direction by a prism 24 disposed in a first lens frame 22, passes through a second lens element 28 (illustrated in FIG. 2) and a zoom lens unit, and is imaged by a non-illustrated CCD disposed in a lower part of the lens barrel 1. The barrier 2 protecting the taking lens is disposed in front of the first lens frame 22 so as to be movable upward and downward. A rotary cam ring 4 is disposed below the first lens frame 22 so as to be concentric with the optical axis of the refracted incident light. The rotary cam ring 4 has a gear portion 4b in an upper part thereof. A zoom driving system 34 transmitting power to the rotary cam ring 4 through the gear portion 4b is disposed at a side of the rotary cam ring 4. A barrier driving cam groove 4a is formed on the outer surface of the rotary cam ring 4, and a lens driving cam groove 4c is formed on the inner surface of the rotary cam ring 4 as shown in FIG. 5.

At a side of the rotary cam ring 4, a driving member guide 8a and a barrier tongue guide 10a are vertically secured between an upper stationary plate 36a provided on the first lens frame and a lower stationary plate 36b which is the upper end of the base. A driving member 8 is engaged with the driving member guide 8a, and a barrier tongue 10 is engaged with the barrier tongue guide 10a. The driving member 8 and the barrier tongue 10 are movable upward and downward along the guides 8a and 10a, respectively.

As shown in FIG. 1, the driving force of the zoom driving system 34 provided adjacent to the lens barrel 1 is transmitted from the zoom driving system 34 to the gear portion 4b provided at the upper end of the rotary cam ring 4, thereby rotating the rotary cam ring 4.

Figure 2:
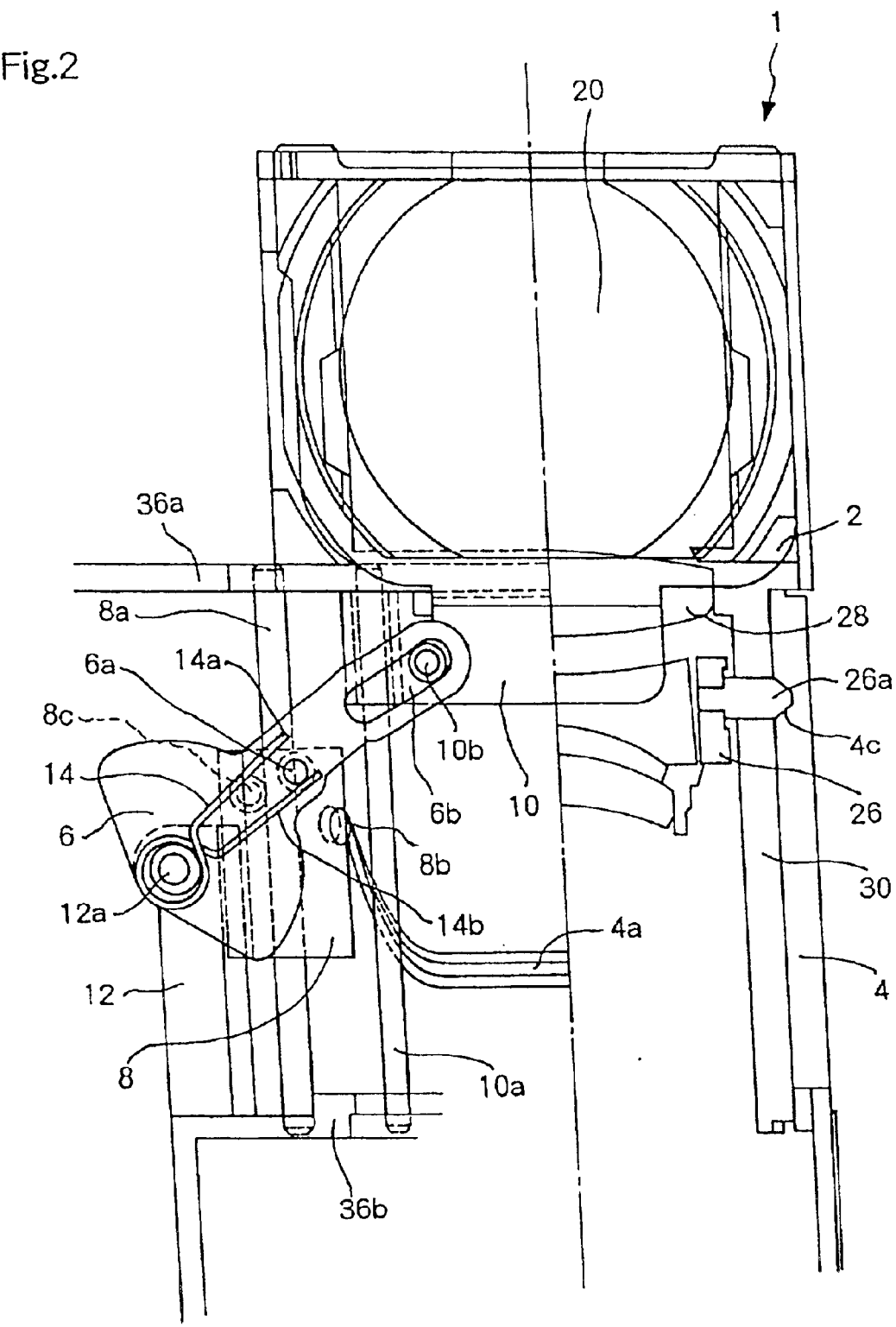
FIG. 2 is a partial cross-sectional front view of the lens barrel of FIG. 1.
Figure 4:
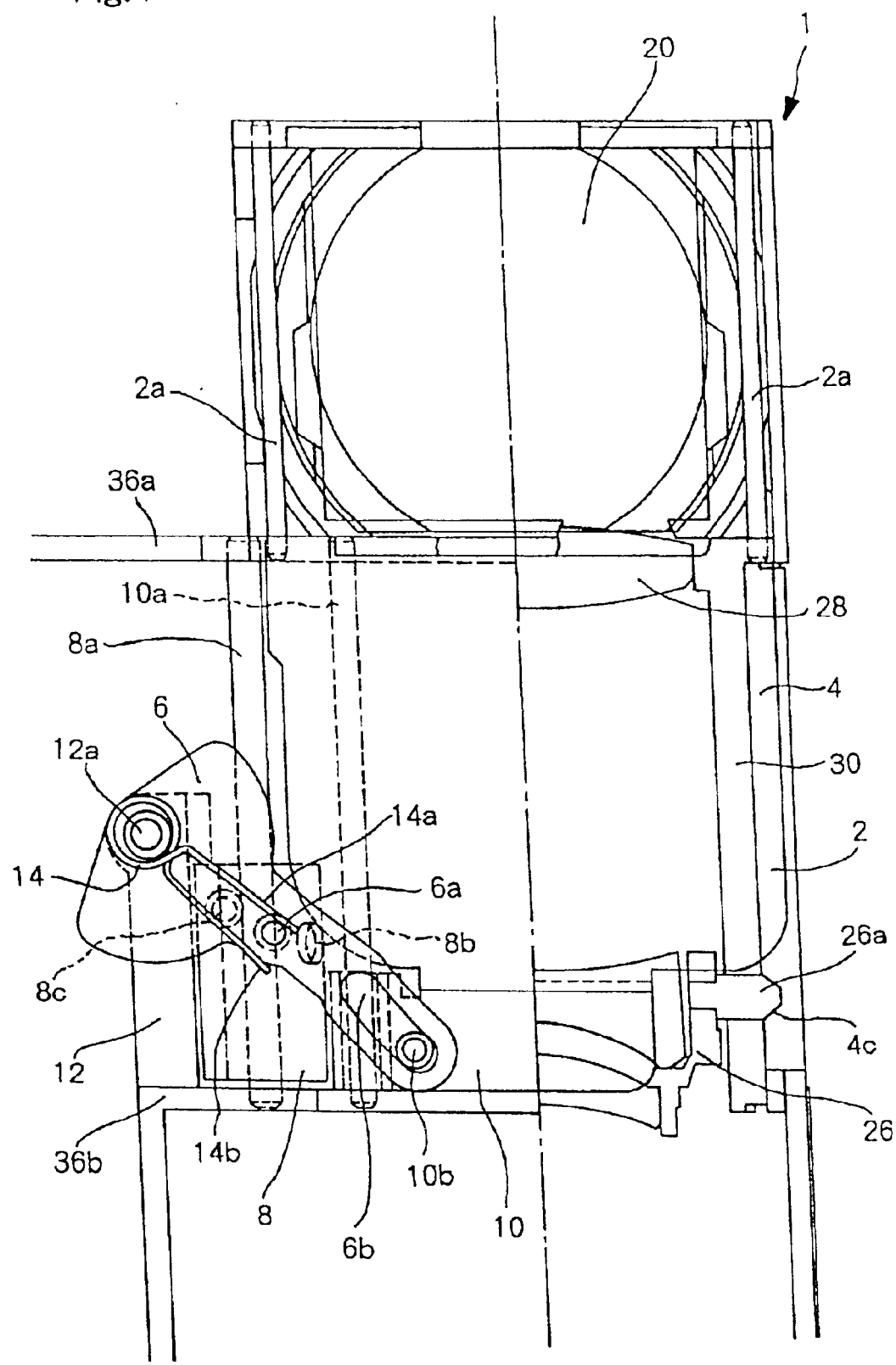
FIG. 4 is a partial cross-sectional front view of the lens barrel in a condition where the barrier is opened.

As shown in FIGS. 2 and 4, a cam follower 26a provided on a third lens frame 26 holding the zoom lens passes through the elongate hole of a zoom system guide 30 to be engaged with the lens driving cam groove 4c provided inside the rotary cam ring 4. By the rotary cam ring 4 rotating on the optical axis, the third lens frame moves along the elongate hole of the zoom system guide to perform zooming.

On the other hand, the cam groove 4a is provided on the outer surface of the rotary cam ring 4 as mentioned above, and a cam pin 8b of the driving member 8 is engaged therewith. By the rotary cam ring 4 rotating on the optical axis, the driving member 8 moves upward and downward along the guide 8a as the cam follower of the cam groove 4a.

The barrier 2 protects the taking lens 20. The barrier 2 comprises one substantially rectangular plate as shown in FIG. 1, and has the barrier tongue 10 disposed below the lens. As described above, the barrier tongue 10 is movable upward and downward along the barrier tongue guide 10a, and the barrier 2 moves in the direction of the optical axis along a barrier guide 2a provided in a vertical direction at each end in front of the taking lens 20 as shown in FIG. 4. When moved upward, the barrier 2 is in a closed position protecting the taking lens 20, and when moved downward, the barrier 2 is in an opened position exposing the taking lens 20 to the outside through the opening 32a of the body 32.

A driving plate 6 is structured so as to move in response to the movement of the driving member 8 by a spring 14 serving as a safety mechanism as described later. The driving plate 6 is rotatably supported by a support shaft 12a provided on a support rod 12. By the driving member 8 moving upward and downward along the guide 8a, the driving plate 6 rotates on the support shaft 12a.

The driving plate 6 moves in response to the movement of the barrier tongue 10. A pin 10b of the barrier tongue 10 is engaged with an elongate hole 6b of the driving plate 6 situated in a position opposed to the support shaft 12a, and by the driving plate 6 rotating on the support shaft, the barrier 2 and the barrier tongue 10 are moved upward and downward along the guides 2a and 10a.

FIG. 5 is a developed view of the rotary cam ring 4. As described above, the rotary cam ring 4 has the barrier driving cam groove 4a and the lens driving cam groove 4c. One barrier driving cam groove 4a is provided on the outer surface of the rotary cam ring, whereas three lens driving cam grooves 4c are provided on the inner surface of the rotary cam ring 4. Although the lens driving cam groove 4c is opened at the upper end of the rotary cam ring 4 and the width of a region 42 is wide because fitting into the third lens frame 26 is necessary at the time of assembly, not all of the width functions as a lens non-driving region described later. The barrier driving cam groove 4a and the lens driving cam groove 4c both have an obliquely extending region for driving the cam follower engaged with the cam groove in the direction of the optical axis, and a region extending substantially perpendicularly to the optical axis (parallel to the rotation direction) for not driving the cam follower.

Taking a look at this with respect to the barrier driving cam groove 4a, the left region 42 where the cam groove extends obliquely is a barrier opening and closing region for driving the driving member 8, and the right region 41 where the cam groove extends substantially perpendicularly to the optical axis is a barrier non-driving region for not driving the driving member 8. Taking a look at this with respect to the lens driving cam groove 4c, the right region 41 where the cam groove extends obliquely is a lens driving region for driving the third lens frame 26, and the left region 42 where the cam groove extends substantially perpendicularly to the optical axis is a lens non-driving region for not driving the third lens frame 26.

While the cam followers 8b and 26a are actually moved by the rotary cam ring 4 rotating on the optical axis as described above in the present embodiment, for ease of understanding, description will be given on the assumption that the rotary cam ring 4 is made stationary for the sake of convenience and the positions of the cam followers 8b and 26a change along the cam grooves 4a and 4c.

As an example, a case will be considered where the cam followers 8b and 26a move rightward from the leftmost end of the cam grooves 4a and 4c in FIG. 5. First, when the rotary cam ring 4 rotates and the cam followers 8b and 26a start to move rightward, the driving member 8 integral with the cam follower 8b engaged with the cam groove 4a moves downward along the guide 8a. The third lens frame 26 engaged with the cam groove 4c merely moves rightward along the horizontal cam groove 4c and its position in the direction of the optical axis does not change. This driving is continued until the cam followers 8b and 26a are moved from the region 42 to the region 41. At the instant when the cam followers 8b and 26a enter the region 41 from the region 42, the driving member 8 is moved to the lowermost position and the barrier ends its movement to the opened position. When the cam followers 8b and 26a are both moved to the region 41, the driving member 8 does not move and the third lens frame moves downward along the cam groove 4c.

Explaining this in association with the operation of the camera, when the barrier 2 is held in the closed position with the main switch of the digital camera off, the cam follower 8b is situated at the left end of the barrier driving cam 4a. The other cam follower 26a is stopped in the middle of the region 42 of the lens driving cam 4c. When zooming is performed while the camera is being operated, control is performed so that the rotary cam ring 4 rotates within the range of the region 41.

By adjusting the positions of the barrier driving cam grooves 4a and the lens driving cam grooves 4c so that the driving regions 41 and 42 of the groves 4a and 4c are switched at the same time or with a slight delay therebetween in consideration of the angular phases of the cam followers 8b and 26a engaged with the cam grooves 4a and 4c, the barrier can be prevented from being driven during photographing operation, and the barrier and the lens can be driven with one rotary cam ring 4.

Figure 3:
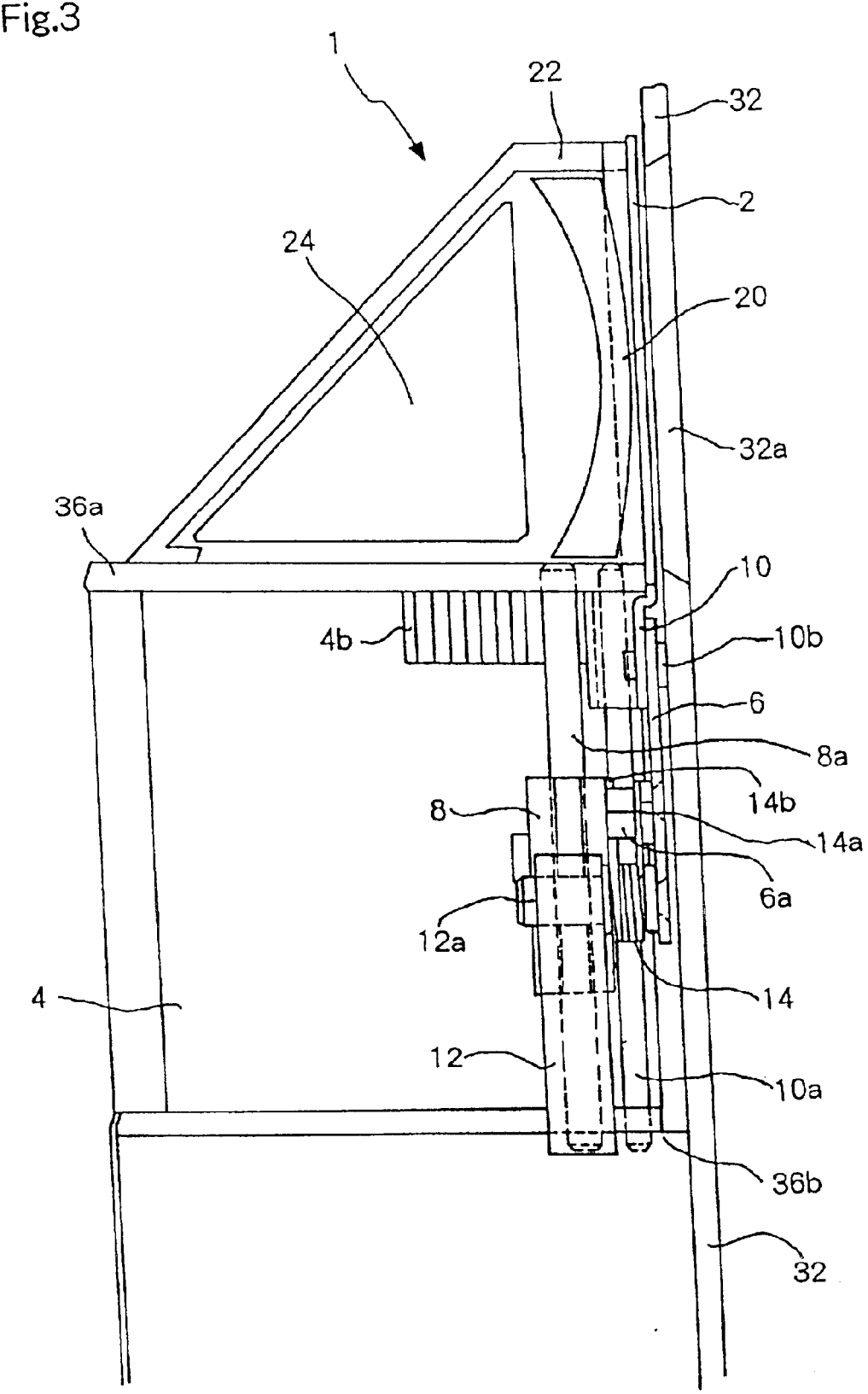
FIG. 3 is a partial cross-sectional side view of the lens barrel of FIG. 1.

Next, the safety mechanism coupling the driving plate 6 and the driving member 8 will be described. As shown in FIGS. 2 to 4, the spring 14 is provided as the safety mechanism coupling the driving plate 6 and the driving member 8. The safety mechanism is provided for preventing an inappropriate force from being applied to the barrier driving mechanism when the barrier is driven so as to move to the closed position with the movement of the barrier obstructed, for example, when the barrier is forcibly moved downward by an external force with the barrier 2 in the closed position or when the barrier is in the opened position and an extraneous object is inserted into the opening 32a or the like.

The spring 14 is a coil spring having spring legs 14a and 14b, and is secured being inserted in the support shaft supporting the driving plate 6. The two spring legs 14a and 14b are pushed so as to be closed. The spring legs 14a and 14b are externally engaged with a pin 8c provided on the driving member 8 and a pin 6a provided on the driving plate 6, respectively. Consequently, the driving member 8 and the driving plate 6 are pushed so as to approach each other by the pushing force of the spring 14 in a direction that closes the spring legs 14a and 14b. It is necessary that the two pins 8c and 6a be disposed in positions not overlapping in the direction of the optical axis.

When the barrier 2 in the closed position as shown in FIG. 2 is forced open, the downward movement of the barrier 2 rotates the driving plate 6 downward. Consequently, the spring leg 14b engaged with the pin 6a moves downward, so that only the spring is charged and no inappropriate stress is applied to the driving member 8. When the rotary cam ring 4 is rotated to the opened position with the barrier in the closed position externally fixed, the driving member 8 moves downward. Consequently, the spring leg 14b is pushed by the pin 8c of the driving member 8 to move downward, so that only the spring is charged and no inappropriate stress is applied to the driving plate 6.

When the rotary cam ring 4 is rotated to the closed position with the barrier in the opened position fixed as shown in FIG. 4, the driving member 8 moves upward. Consequently, the spring leg 14a is pushed by the pin 8c of the driving member 8 to move upward, so that only the spring is charged and no inappropriate stress is applied to the driving plate 6. When the barrier in the opened position is forced close, the upward movement of the barrier 2 rotates the driving plate 6 upward. Consequently, the spring leg 14a is pushed by the pin 6a to move upward, so that only the spring 14 is charged and no inappropriate stress is applied to the driving member 8.

As described above, according to the present invention, since the barrier can be independently driven by the rotary cam ring used as the lens driving mechanism and the structure is simple, an inner slide barrier can be structured in a size substantially the same as the size of the in-barrel barrier compared to the circular collapsible lens barrel. Moreover, since the barrier and the zoom lens can be driven with a short stroke necessary for the barrier and the zoom lens to deliver their functions, the lens barrel can be reduced in size.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A barrier opening and closing mechanism, comprising:
   a refractive optical system having a plurality of lens elements which are disposed so as to turn light substantially at a right angle;
   a lens barrel for holding the refractive optical system;
   a rotary cam ring disposed concentrically with the lens barrel, having a first cam groove, and for rotating on an optical axis of subject light having been turned;
   a lens driving mechanism for driving, in a direction of the optical axis of subject light having been turned, at least one lens element included in the refractive optical system engaged with the first cam groove; and
   a barrier member for protecting a most subject side lens element of the refractive optical system; and wherein
   the rotary cam ring has, in a predetermined angle range on an outer surface thereof, a second cam groove including a region extending obliquely to the optical axis,
   a driving member is provided that has a cam follower engaged with the second cam groove and is driven in a direction substantially parallel to the optical axis, and
   the barrier is opened and closed by moving in response to a movement of the driving member in the predetermined angle range.

2. A barrier opening and closing mechanism as claimed in claim 1, wherein the barrier is driven in a direction substantially parallel to the optical axis.

3. A barrier opening and closing mechanism as claimed in claim 1, wherein the second cam groove extends in a direction substantially vertical to the optical axis outside the predetermined angle range.

4. A barrier opening and closing mechanism as claimed in claim 1, wherein the first cam groove extends in a direction substantially vertical to the optical axis in the predetermined angle range.

5. A barrier opening and closing mechanism, comprising:
   a taking lens comprising an incident portion on which light is made incident, a turning portion turning incident light substantially at a right angle, and a light directing portion directing turned light to an image sensing device;
   a barrier member held so as to be rectilinearly movable in a direction parallel to the light directing portion, and protecting the taking lens by coming out and retracting to and from a front surface of the taking lens in the incident portion; and
   a rotary cam ring having a first groove in a side wall thereof and juxtaposed so that the turned light passes through the rotary cam ring and so that the first groove is coupled to a portion of said barrier member so that rotation of said rotary cam ring causes rectilinear motion of said barrier member.

6. A barrier opening and closing mechanism as claimed in claim 5, further comprising a driving member for controlling the rotation of the rotary cam ring.

7. A barrier opening and closing mechanism as claimed in claim 5, wherein the rotary cam ring has a second groove coupled to a portion of the taking lens so that rotation of the rotary cam ring causes movement of at least a portion of the taking lens.

8. A barrier opening and closing mechanism as claimed in claim 7, wherein the first and second grooves are disposed on said rotary cam ring such that rotation of said rotary cam ring through a first angle causes movement of said barrier member and rotation of said rotary cam ring through a second angle causes motion of said portion of said taking lens.

9. A barrier opening and closing mechanism, comprising:
a taking optical system on which subject light is made incident;
a barrier member movable between a position that covers a front surface of the taking optical system and a position retracted from the front surface of the taking optical system; and
a barrier driving means for rectilinearly driving the barrier member in a direction transverse to a direction of an optical axis of the taking optical system.

10. A barrier opening and closing mechanism as claimed in claim 9, wherein the taking optical system has a turning portion turning incident light substantially at right angles.

11. A barrier opening and closing mechanism as claimed in claim 10, wherein the barrier driving means drives the barrier member in a direction parallel to the incident light having been turned.

12. A barrier opening and closing mechanism as claimed in claim 9, the taking optical system has a movable optical member, and single controlling means is provided for driving the barrier driving means and the optical member.

13. A barrier opening and closing mechanism as claimed in claim 12, the controlling means comprises cam grooves of different configurations provided in one cam ring.

14. A barrier opening and closing mechanism as claimed in claim 13, wherein the cam grooves are formed so that the optical member is not driven when the barrier is driven and that the barrier is not driven when the optical member is driven.

15. A barrier opening and closing mechanism as claimed in claim 9, wherein said barrier driving means comprises a ring cam.

16. A barrier opening and closing mechanism as claimed in claim 15, wherein rotation of said ring cam about its axis causes rectilinear motion of said barrier member in a direction parallel to the axis.

17. A barrier opening and closing mechanism as claimed in claim 15, wherein said ring cam includes a first portion for moving said barrier member.

18. A barrier opening and closing mechanism as claimed in claim 17, wherein said taking optical system comprises a movable member and said ring cam includes a second portion adapted for moving said movable member of said taking optical system.

19. A barrier opening and closing mechanism as claimed in claim 18, wherein the first and second portions of said ring cam comprise first and second grooves disposed on side walls of said ring cam such that a first portion of a rotation of said ring cam causes movement of said barrier member and a second portion of a rotation of said ring cam causes motion of said movable member of said taking optical system.

20. A barrier opening and closing mechanism as claimed in claim 19, wherein the first and second grooves are disposed so that a third portion of a rotation of said ring cam causes movement of both the barrier member and the movable member of said taking optical system.

* * * * *